United States Patent [19]
Miller

[11] 3,800,164
[45] Mar. 26, 1974

[54] REDUNDANT LOGIC CIRCUIT

[75] Inventor: Frederic L. Miller, San Diego, Calif.

[73] Assignee: The United States of America as represented by the Secretary of the Navy, Washington, D.C.

[22] Filed: Jan. 2, 1969

[21] Appl. No.: 790,511

[52] U.S. Cl. .................. 307/204, 307/219, 328/147
[51] Int. Cl. ........................ H01j 19/82, G06f 11/08
[58] Field of Search .................................... 307/219

[56] References Cited

UNITED STATES PATENTS 3,116,477 12/1963 Bradbury ........................... 307/219

*Primary Examiner*—Maynard R. Wilbur
*Assistant Examiner*—N. Moskowitz
*Attorney, Agent, or Firm*—R. S. Sciascia; P. Schneider

[57] ABSTRACT

This invention is directed to a redundant logic system having a plurality of input channels and a single output channel. The system initially senses and compares the absolute magnitude of two of the input channels. When the magnitudes are identical, a switch is initiated in one of these channels to connect it to the output channel. When one of the channels fails, the compared output of the absolute magnitude detectors is utilized to insure that the channel which has failed is disconnected and that the operating channel is connected to the output channel. The fail-operational capacity may be increased in a cascade fashion by utilizing the single output of the first channel together with another input channel. Monitoring means are also provided to detect where failures have occurred.

7 Claims, 2 Drawing Figures

INVENTOR
FREDERIC L. MILLER

BY Arthur L. Lessmann
Thomas J. Madden
ATTORNEYS

REDUNDANT LOGIC CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention is directed to a redundant logic system. The inventive system has a plurality of input channels and a single output channel. The system is operative to maintain an output signal after all but one of the input channels has failed.

2. Description of the Prior Art

Redundant systems having a plurality of input channels and a single output channel are known. A major disadvantage of these prior art systems is that a failure in one of the input channels will result in a reduction of the overall gain of the system by a factor of two. In numerous applications this drop in gain is not tolerable and these systems cannot be used.

The prior art systems also have no simple means of indicating which input channel has failed. This information is important because it allows alert maintenance and gives a warning as to the system's status.

SUMMARY OF THE INVENTION

This inventive system overcomes the disadvantage of the prior art. Utilizing as few as two input channels, the system provides fail-operational capability with no drop in the overall gain of the system. The inventive system is constructed to allow simple straightforward monitoring of its status. In addition, a cascading arrangement is utilized to allow the system to have an unlimited number of input channels and to still remain operational after failure of all but one channel. The system utilized has a further advantage in that all the detecting components utilized in the system operate out of the main path of current flow with only switches operating between the inputs and the outputs.

The basic building block of the inventive system utilizes two input channels which are connected to a single output channel. The two input channels are connected through a circuit designated as the largest value selector to a summing network which provides a single output channel. The largest value selector utilizes two absolute magnitude detectors, one of which is connected to each channel and two switches, one of which is also connected to each channel. The absolute magnitude detectors measure the absolute magnitude of the voltage in each channel. The absolute magnitudes of the voltage are then subtracted with the sign of the difference obtained being utilized to turn on one or the other of the two switches which is connected in each channel. When the outputs of the two channels are identical, one of the two switches is arbitrarily closed.

In order to cascade the system, the output from the summing network is fed together with the output of a third channel to a second largest value selector. This operation is then repeated for each new channel added. Monitoring means are provided at the output of each largest value selector and at the output of the subtracting circuit.

It is an object of the present invention to provide a new and improved redundant logic system.

It is a further object of the present invention to provide a redundant logic system which provides an output signal whose gain is unchanged by a failure in the system. It is a still further object of the present invention to provide a redundant logic system in which failures are easily monitored.

Yet another object of the present invention is to provide a redundant logic system whose fail-operational capacity may be increased in cascade fashion.

Other objects, advantages and novel features of the present invention will become apparent from the following detailed description of the invention when considered in conjunction with the accompanying drawings.

DESCRIPTION OF THE PREFERRED EMBODIMENTS

Figure 1:
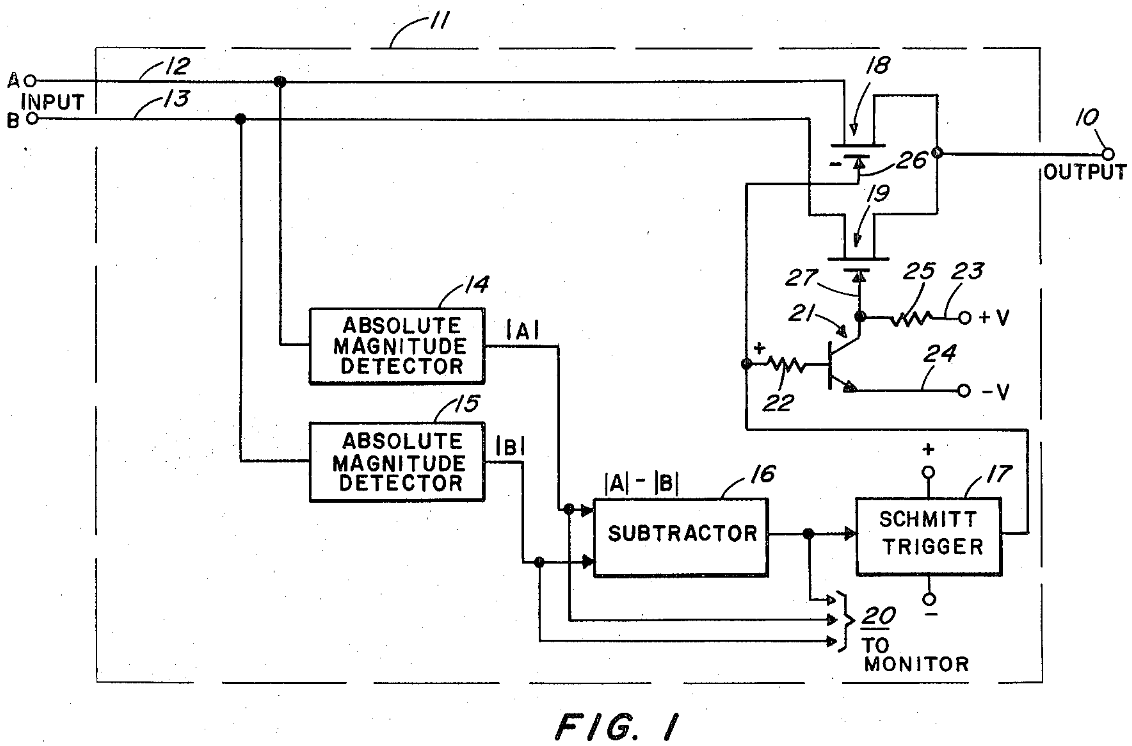
FIG. 1 shows the basic building block of the inventive system.

The basic building block of the invention provides a single output at 10 from two input channels A and B. These channels are connected by input lines 12 and 13 to circuit 11 which for purposes of description is designated as the largest value selector.

In the largest value selector 11, absolute megnitude detectors 14 and 15 are connected to each input channel through lines 12 and 13. The outputs of the detectors are combined in a subtractor 16 and the output of the subtractor 16 is then fed to a Schmitt trigger 17. A monitor is connected at 20 to the output of the subtractor 16 and the absolute magnitude detectors 19 and 20.

The output of the Schmitt trigger 17 is connected to control two field-effect transistors 18 and 19. The output of the trigger 17 is connected directly to field-effect transistor 18. Field-effect transistor 19 is controlled by trigger circuit 17 through use of a NPN transistor 21. Trigger 17 is connected through resistor 22 to the base of 21 and a bias source V is connected across the emitter-collector path of 21 through terminals 23 and 24 and resistor 25.

In operation, identical inputs are received at inputs 12 and 13 and are fed to absolute magnitude detectors 14 and 15. These detectors measure the absolute magnitudes $|A|$ and $|B|$ of the voltage of the input signals. These detectors were chosen because their outputs are a positive-going signal equal in magnitude to the input signals regardless of the input polarity. Detectors of this type are well-known and may be used with alternating or direct current inputs. A description of the type used here may be found in the *Application Manual for Modelling, Measuring, Manipulating and Much Else*, Philbrick Research, Inc., (Nimrod Press, Dedham, Mass., 1966) at page 59.

The outputs of 14 and 15 are subtracted at 16 to provide an output $|A| - |B|$. The polarity of this output is operative to trigger a Schmitt trigger circuit 17. The output of the trigger 17 is then utilized to control the field-effect transistors 18 and 19 and connect either channel A or channel B to the output 10.

When the output of the Schmitt trigger is negative, the gate 26 of transistor 18 is open and current will flow from channel A through line 12 to output 10. At the same time a negative bias will be applied to NPN transistor 21, no current will flow through it and voltage source V will apply a positive bias to the gate 27 of transistor 19 through terminal 23 and resistor 25. Current flow through 19 will be cut-off and no signal from channel B will reach output 10.

When the output of the trigger 17 is positive, a positive bias will be applied to gate 26 of transistor 18 and no current will flow from channel A to output 10. The positive bias will also be applied to the base of NPN transistor 21 to turn on this transistor and initiate current flow from source V through terminal 23, resistor 25 and the emitter-base path of 21 to terminal 24. This flow applies a negative bias to gate 27 of transistor 10 which then allows current to flow from terminal B to output terminal 10.

When the output of |A|, equals the output of 15, |B| 9, the trigger circuit, depending on whether PNP or NPN transistors are used, will open one of the two field-effect transistors 18 or 19 to allow current to pass. In the example used here, 19 will be assumed to allow current passage when |A| equals |B|.

When channel A or B fails, the largest value selector 11 will pass the signal having the greatest amplitude and will block the other signal. This result is achieved because failure in either channel results in a reduced output in that channel and the largest value selector as its name suggests passes the larger of the two values |A| and |B|.

When channel A fails,|A|− |B| at subtractor 16 is less than zero. The output of the substractor has a negative polarity and causes the trigger to switch and yield a negative output. This output will, as discussed above, initiate transistor 19 to allow current to flow from channel B to output 10 and will initiate transistor 18 to block current flow from channel A to output 10. When channel B fails, |A| − |B| at subtractor 16 is greater than zero and the output of the substractor will have a positive polarity. This positive signal will cause the trigger to change state and yield a negative output. This output will, as discussed above, initiate transistor 18 to allow current to flow from channel A to output 10 and will initiate transistor 19 to block current flow from channel B to output 10.

Finally, when |A| equals |B|, both channel A and B are operative and no signal will be supplied by the subtractor to the trigger circuit. The circuit will, therefore, stay at its relaxation state and yield a positive output. This will allow current to flow from channel A to output 10.

The largest value selector insures that the operational channel will always be connected to the output 10. It also insures that an operational channel will be connected to the output 10 if there is a failure to the left of the Schmitt trigger and no failure in either channel. The invention thus provides fail-operational capacity with only a two channel input. It continuously and automatically provides an operational output with a constant gain after any single failure.

A monitor may be connected at 20 to the output of subtractor 16 and the absolute magnitude detectors 14 and 15. The monitor may be any of a variety of circuits which when connected to the output of 14 and the output of 15 will indicate that the current has failed in these branches. One common type would comprise a relay in each channel which holds open an associated contact in a circuit path between a battery and a lamp or similar indicating device. When channel A, for example, fails there will be no output from the relay and its associated contact will close to turn on the indicator.

Figure 2:
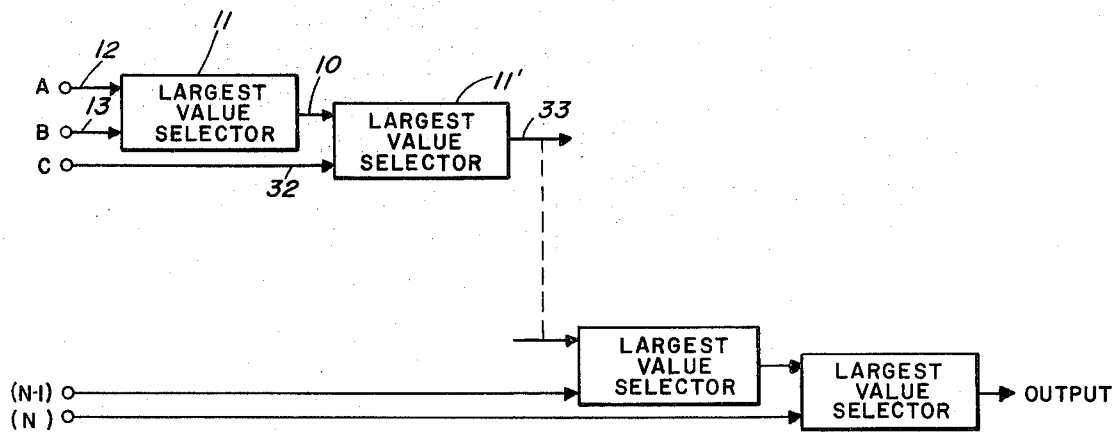
FIG. 2 shows the cascaded arrangement utilized in the inventive system.

In FIG. 2, the cascaded arrangement is shown. As seen in this circuit the output 10 of the largest value selector 11 is connected to a second largest value selector 11' which is identical to 11. The output of a third channel C is also connected to 11' at 32. The operation of the largest value selector 11' is also identical to that of 11 and an output will still be obtained at 33 if any two of the inputs from channels A, B and C fail. In the circuit shown in FIG. 2, a largest value selector is added for each new channel and the construction and operation of each of these will be identical to that of 11. The cascaded system can have N inputs and one output, where N is any number. The system will be operation after any (N−1) failures.

Thus, it is seen that a new and improved redundant logic system has been provided. The system insures that the gain of the system will be constant despite the failure of all but one of the input channels. Failures in the system may be easily monitored and, in addition, an efficient method of cascading the system has been provided.

Obviously many modifications and variations of the present invention are possible in the light of the above teachings.

What is claimed is:

1. A redundant logic system comprising:
two input channels and one output channel,
first switching means connected in each of said two channels;
first comparing means connected to receive an input from each of said two input channels including subtracting means operable to provide an output indicative of the difference; and
first bistable means connected to the output of said first comparing means and the input of said first switching means and operable to connect either of said two input channels to the output channels in response to the output of said comparing means.

2. A redundant logic system as in claim 1 wherein said first bistable means is a Schmitt trigger circuit.

3. A redundant logic system as in claim 2 wherein said first comparing means further includes:
two absolute magnitude detectors connected to receive the input from said two input means;
said absolute magnitude detectors being operable to provide a signal at their outputs which is indicative of the absolute magnitude of the signal on the input channel to which they are connected;
the outputs of said absolute magnitude detectors being connected to said subtractor which subtracts the signals received therefrom.

4. A redundant logic circuit as in claim 3 wherein said first switching means utilizes two field-effect transistors.

5. A redundant system as in claim 4 further comprising monitoring means connected to the outputs of said absolute magnitude detectors.

6. A redundant logic system as in claim 1 further comprising:

a third input channel and a second output channel;

second switching means connected in said thir input channel and said one output channel;

second comparing means identical to said first comparing means and connected to receive an input from said one output channel and said third input channel; and second bistable means connected to the output of said second comparing means and the input of said second switching means and operable to connect either said one output channel or said third input channel to said second output channel.

7. A redundant logic circuit as in claim 1 wherein said first switching means, said first comparing means and first bistable means comprise a circuit designated as a largest value selector and wherein:

*n* additional input channels are provided and n additional absolute magnitude detectors are provided, where *n* equals any number;

the input to each additional largest value selector being provided by the output of the preceding largest value selector and by one additional input channel.

* * * * *